United States Patent
Wallace

(10) Patent No.: US 7,245,109 B2
(45) Date of Patent: Jul. 17, 2007

(54) TEMPERATURE SENSITIVE POWER CONVERTER

(75) Inventor: Bill Wallace, Galveston, IN (US)

(73) Assignee: Parailax Power Supply, LLC, Anderson, IN (US)

( * ) Notice: Subject to any disclaimer, the term of this patent is extended or adjusted under 35 U.S.C. 154(b) by 54 days.

(21) Appl. No.: 11/290,374

(22) Filed: Nov. 30, 2005

(65) Prior Publication Data

US 2007/0120535 A1    May 31, 2007

(51) Int. Cl.
*H02J 7/16* (2006.01)

(52) U.S. Cl. ..................... 320/144; 320/153
(58) Field of Classification Search ............ 320/150, 320/144, 153; 324/431
See application file for complete search history.

(56) References Cited

U.S. PATENT DOCUMENTS 5,204,611 A * 4/1993 Nor et al. ................ 320/145
5,710,506 A * 1/1998 Broell et al. ............. 320/145

* cited by examiner

*Primary Examiner*—Adolf Deneke Berhane
*Assistant Examiner*—Aaron Piggush
(74) *Attorney, Agent, or Firm*—Vincent J. Allen; Carstens & Cahoon, LLP

(57) ABSTRACT

The present invention provides a power converter for recreational vehicle (RV) batteries that uses time and ambient temperature to control output voltage. By employing a remote temperature sensor attached to the battery post, temperature information is sent to an output voltage control circuit in the power converter. When the power converter is powered up an internal timing circuit increases the output voltage by a preset amount for a timed period for rapid charging but is also adjusted to predetermined temperature curve controlled by the remote temperature sensor to prevent overcharge. The output voltage is held at the increased value until the internal timing circuit times out and the output voltage is reduced (setback) to the float voltage determined by the remote temperature sensor.

13 Claims, 3 Drawing Sheets

TEMPERATURE SENSITIVE POWER CONVERTER

BACKGROUND OF THE INVENTION

1. Technical Field

The present invention relates generally to power converters and more specifically to temperature sensitive power converters for recreational vehicles.

2. Description of Related Art

Lead acid batteries are made up of plates, leads, and lead oxide with a sulfuric acid/water solution. Other elements may be used to change density, hardness, porosity, etc. The acid/water solution is an electrolyte solution which causes an electrochemical reaction that produces an electric current. This electrochemical reaction causes sulfur ions to accumulate on the battery plates. Recharging the battery causes the sulfur to return to the electrolyte solution.

Quickly charging the lead acid batteries employed in recreational vehicles (RVs) over wide ambient temperature ranges, without over or under charging, is a problem that has always plagued the industry. Increasing the initial charging voltage for a predetermined length of time (also known as "rapid charging") has been somewhat successful. However, the risk of over charge at high ambient temperatures is still a major problem. Reducing the rapid charging time the increased charging voltage is maintained may result in an undercharge condition at low ambient temperatures.

Because ambient temperatures fluctuate significantly during the various seasons, and over different parts of the world, it is impossible to set the time and charging voltage at fixed values and achieve adequate results over such diverse climates. Lead acid batteries are very sensitive to ambient temperature. The ambient temperature affects the current that a battery will accept at a given charging voltage. Another variable that affects the current flow when a charging voltage is applied is the state of charge of the battery. However, determining this variable is not practical in real life as it would require the user to check the specific gravity of the electrolyte of the battery and then to select predetermined charge cycles based on temperature and state of charge before starting the charging process. In general, this method is excellent but would be cumbersome and impractical in the case of batteries employed in recreational vehicles (RVs).

In the past, the output voltage of power converters was set at a nominal 13.8 volts, which was a middle of the road approach that would not overcharge the battery to a great extent at high ambient temperatures of 86° F. (30° C.) while giving the battery a reasonable charge at room temperatures of 77° F. (25° C.). This approach, however, gives less than desirable results when ambient temperatures drop below 68° F. (20° C.).

Based on leading battery manufacturers' recommendations, float voltages (the voltage to maintain the state of charge) range from approximately 13.0 volts at 122° F. to 14.7 volts at 0° F. The recommendation for a deep rapid charge ranges from 13.74 volts at 122° F. to 15.48 volts at 0° F. However, the rapid charge voltages cannot be maintained indefinitely because of overcharge problems.

Therefore, a charging system is needed that automatically adjusts the charging voltage applied to RV batteries based on ambient temperature. A charging system is needed that adjusts the charging voltage to monitor a rapid charge voltage for a predetermined period of time at a voltage level recommended by the manufacturer for the ambient temperature. Further, a charging system is needed that adjusts the charging voltage to maintain a float voltage after the initial rapid charge as recommended by the manufacturer for the ambient temperature.

SUMMARY OF THE INVENTION

The present invention provides a charging system that controls output voltage based in part on ambient temperature. In one embodiment, a remote temperature sensor attached to the battery post sends temperature information to an output voltage control circuit in the charging system. When the power converter is powered up, an internal timing circuit increases the output voltage by a preset amount for a timed period for rapid charging but the output voltage is limited based on the temperature sensed at the battery. The maximum voltage is adjusted based on a predetermined temperature curve. The output voltage is held at the increased value until the internal timing circuit times out and the output voltage is reduced (setback) to a float voltage. Similarly, the output voltage control circuit varies the float voltage as a function of the ambient temperature sensed by the remote temperature sensor such that the float voltage corresponds to a second pre-determined temperature curve.

In one embodiment, output voltages are based on battery manufacturers' suggested charging and float voltages versus temperature curves, respectively, for the initial charge and the setback charge. In one embodiment, lower charging voltages are used at low temperature than those suggested by most battery manufacturers due to other loads connected to the battery in recreational vehicles, thus avoiding damage to appliances and lengthening tungsten lamp life considerably. In one embodiment, the converter output voltage is limited to 14.4 volts to minimize this problem, despite any higher recommendation outputs by the manufacturer for a given temperature.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The present invention controls the output voltage of a converter/charger in a recreational vehicle for optimum battery charging and maintenance in relation to battery temperature.

Figure 1:
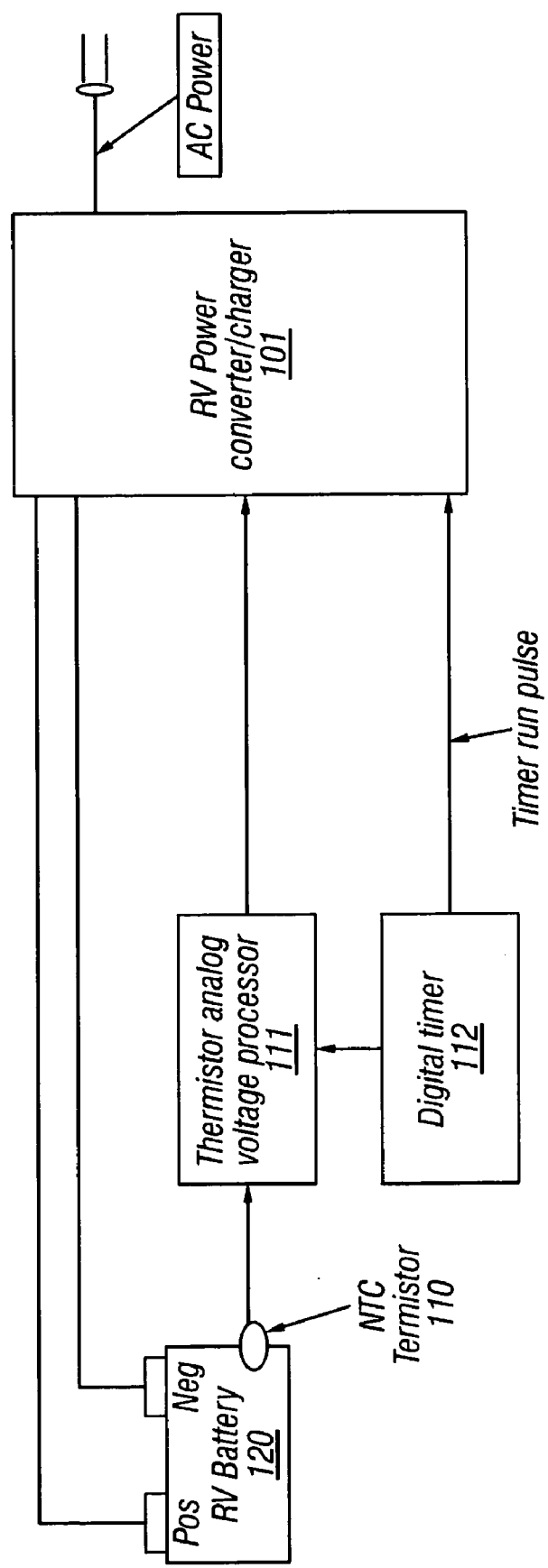
FIG. 1 is a block diagram of a power converter/charger system in accordance with an embodiment of the present invention.

FIG. 1 is a block diagram of a power converter/charger system in accordance with an embodiment of the present invention. In this embodiment, the power converter/charger operates in two modes: a rapid charge mode and a float voltage (or setback) mode. The present invention solves the over/under charging problems of the prior art by controlling the charging voltage of these two modes as a function of temperature.

Power converters/chargers have a set reference voltage against which they compare the output voltage of the battery. The charger immediately compensates for any deviation from this reference voltage. The present invention adds a temperature compensation circuit to a standard power converter/charger that alters the voltage that the charger sees coming from the battery. In this manner, the temperature compensation circuit can alter the function of the charger without having to change the reference temperature of the charger, allowing the present invention to be implemented using off the shelf power converters.

In one embodiment, the charging voltage is controlled based on the ambient temperature at or near the battery. Upon power-up, the charging system enters a rapid charge mode for a predetermined length of time (e.g., 4 hrs). The time period used for rapid charge is based on empirical testing of each battery model without temperature compensation. This may result in conservative rapid charging periods in some cases. The process is a tradeoff between speeding up the charging process at low ambient temperatures and protecting electrical loads connected to the battery (e.g., tungsten lamps, radios, etc.) at high ambient temperatures. Because a greater percentage of recreational vehicles (RVs) tend to be owned and operated in warmer climates (e.g., Arizona), the rapid charge mode is set to err on the side of safety to protect connected loads.

Another embodiment of the present invention provides a user option to rerun the rapid charge period if necessary. The rapid charge voltages are started by powering up the power converter/charger with a user option to rerun the timer after the initial time has expired. This rerun option can be executed by a user-accessible push button switch located inside the vehicle. A visual light emitting diode (LED) indicator light may also be included with the remote switch. The rerun option is most suitable to those situations (mostly cold weather) in which the conservative rapid charge period may not be ideal for the customer's needs.

Whether in the rapid charge or the float charge mode, the output voltage of the charger/converter is generally temperature compensated according to battery manufacturers' recommendations. In one embodiment, temperature sensing is performed with a 10 kohm type "J" NTC thermistor 110 connected between the battery post of the RV battery 120 and the converter/charger 101 by a two conductor cable.

A voltage processor 111 supplies voltage control to the power converter/charger 101. When the power converter is powered up, an internal timing circuit 112 increases the output voltage for rapid charging but is also adjusted according to a predetermined temperature curve controlled by the remote temperature sensor to prevent overcharge. The output voltage is held at the increased value until the internal timing circuit times out, and the output voltage then is reduced (setback) to a predetermined float voltage according to the temperature sensed by the remote temperature sensor 110.

In one embodiment, output voltages are based on battery manufacturers' suggested charging and float voltages versus temperature curves. The temperature compensation is effective between 0° and 50° C. (32° to 122° F.).

Output voltage limits may be imposed on the power converter/charger even if the desired manufacturer-suggested charging voltage is higher. This is done because loads (e.g., tungsten lamps, radios, TVs, electronic control boards in hot water tanks, furnaces, etc.) may be connected to the RV battery, and the voltages recommended by the battery manufacturers, while safe for the battery itself might be too high for these additional loads. For example, one embodiment limits the charging voltages at cold temperatures (e.g., below 20° F.) due to the connected loads employed in RV service. The manufacturers' recommended charging voltages may exceed 15.5 volts at cold temperatures but such high voltage would destroy connected lamps and other electronic systems.

In one embodiment of the present invention, 14.45 volts is set as the upper limit in order to protect such devices. These limits on the charger obviously limit the capability to charge batteries at cold temperatures. However, temperature compensation also prevents over charging at higher temperatures.

Figure 2:
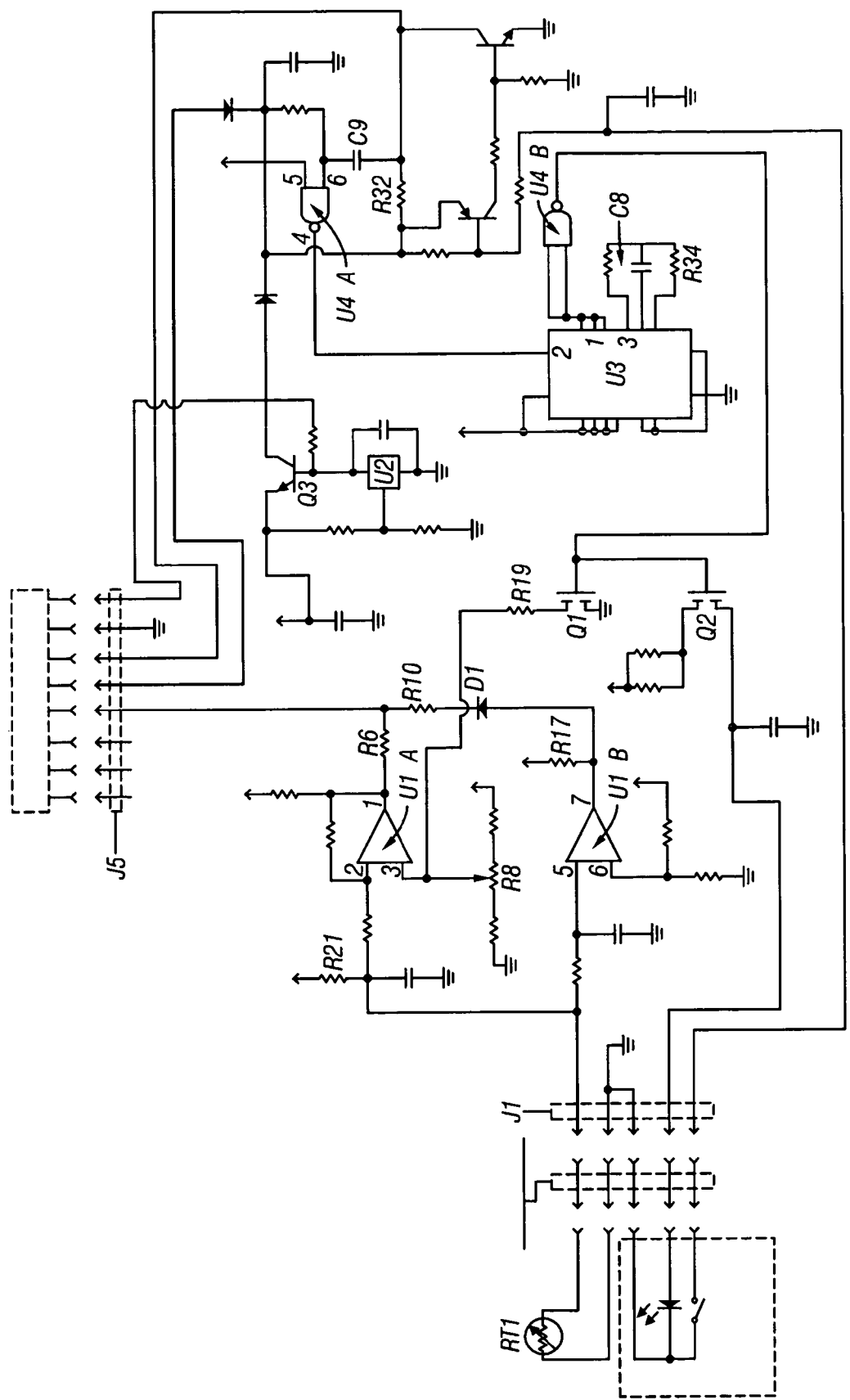
FIG. 2 is a circuit diagram of timer/temperature compensation circuitry for a power converter in accordance with an embodiment of the present invention.

FIG. 2 is a circuit diagram of timer/temperature compensation circuitry for a power converter in accordance with an embodiment of the present invention. The circuit can be broken down into several minor sections and are comprised of the following basic components:

(1) U2 and Q3 form a precision regulated temperature stable 5 volt dc supply.

(2) U1a is a unity gain inverting operational amplifier.

(3) U1b is a probe monitor in case of broken cable or open probe thermistor.

(4) U3 is a programmable timer IC.

The RT1 NTC thermistor (connected to the battery post) and R21 form a voltage divider across the 5 volt power supply. The voltage at the junction of RT1 and R21 is proportional to the battery temperature. Therefore, as the resistance of RT1 changes upward (temperature going down) the voltage correspondingly moves up. If the temperature of RT1 moves higher, the voltage at the junction of RT1 and R21 moves down towards ground.

This signal voltage is fed into amplifier U1a via resistor R9. U1a is biased as a unity gain inverting operational amplifier, which reverses the signal voltage swing from the original input at pin 2 of U1a. Therefore, the U1a pin 1 output changes in the same direction as the temperature of the battery. This is done to make the signal voltage compatible with the control point located on the board of the power/converter. The U1a control signal is fed to the power converter main board J5 via resistor R6.

The point of reference for RT1 is 10 K ohms at 25° C. (77° F.) and is referred to as room temperature. With a precision 10 Kohm resistor substituted for RT1, the output control voltage at the junction of resistors R6 and R10 can be calibrated to exactly 3.4 volts dc. This is done by adjusting resistor R8 calibration potential feeding the + input of U1a.

When the 3.4 volt control voltage is connected to the main board control circuit J5 of the power converter/charger, a shift from the original set point of 13.8 volts to 13.4 volts in converter output is noted when in float mode. The power converter is calibrated to 13.8 volts output before the temperature control circuit is connected. As the control voltage swings up or down from the 3.4 volt reference control point, the output of the power converter also swings up or down from its initial 13.8 volt set point in step with the RT1 temperature sampled at the battery post.

The RT1 probe connected to the battery post is monitored for an open thermistor or cable by probe monitor U1b. U1b is biased such that the output pin 7 is low (almost ground potential) under normal operation. If the sensor cable is broken or the thermistor opens, the voltage at pin 5 of U1b moves up to the 5 volt supply potential and the U1b output pin 7 goes high. When this occurs, diode D1 becomes forward biased feeding the 5 volt supply voltage through R17 and R10 into the control voltage point. This shifts the control voltage feeding the power converter, resulting in a safe 13.8 volt output of the converter. If this was not done the control voltage would shift the converter output voltage too high, causing battery failure along with failure of many of the loads connected to the RV battery circuits.

If the temperature probe becomes shorted, by default the U1a operational amplifier shifts the control voltage such that the power converter output drops to approximately 12.95 volts, which is in the safe zone of RV connected loads. This voltage is not high enough to do much charging of the RV battery(s) but is a safe voltage as far as a probe failure.

U1a is biased to nearly cutoff (output swing will no longer shift upward) when the probe resistance is 3602 ohms. This is the resistance at 50° C. (122° F.) and temperature compensation is terminated. At that point the output voltage of the converter is already at 13.0 volts. Any drop in resistance below 3602 ohms is considered a defective probe or shorted cable assembly, and the output will hold steady at approximately 13.0 volts. The user is therefore warned by poor battery performance, yet the failed temperature compensation system will not destroy the battery.

The 5 volt supply employs a programmable reference integrated circuit (IC) U2 (e.g., a TL 431) with a negative-positive-negative (NPN) emitter follower Q3 to supply the 5 volt power. The reference is a very temperature stable device with excellent output regulation. It receives power from an auxiliary power source employed in the power converter main board J5.

When the power converter/charger is powered up (shoreline 120 VAC applied) a signal is supplied to the junction of R32 and capacitor C9 from the power converter main board J5. This signal pulls C9 to ground, which had been previously biased to the Vcc voltage level (approx. 13 volts) through R32. This pulls pin 6 of U4a momentarily towards ground.

U4a is a 2-input Not And (NAND) Schmitt trigger device. Pin 5 of U4a is also biased up to 13 volts from the Vcc power buss. When pin 6 drops towards ground the output pin 4 of U4a that is normally low (almost ground) goes high (towards Vcc), in the form of a very short fast rise time pulse. This pulse is connected to pin 2 of U3.

U3 is a programmable digital timer IC that controls the length of the rapid charge mode. When U3 receives the pulse from U4a through pin 2 it begins counting its internal clock pulses. The clock frequency is determined by the values of C8 and R34. The clock pulses are counted by U3's 24-stage binary ripple counter.

Output pin 1 of the timer IC U3 normally is in the high state. At the start of the count, pin 1 goes low causing U4b output pin 3 to go high. At the end of the 24-stage count time, output pin 1 of U3 returns to its normal high state and stops the clock countdown cycle.

The output pin of U4b is connected to the gates of Q1 and Q2 Field Effect Transistors (FET). Q1 and Q2 act as switches. The Q1 drain pin is connected to R19 and in turn is connected to pin 3 of U1a Inverting operational amp. When Q1 is switched on by the signal from U4b it pulls pin 3 of U1a down just enough to shift the output of the power converter about 0.45-0.50 volt higher. This results in a rapid charge mode. As long as the timer IC U3 is counting clock pulses the output of the power converter/charger is in the rapid charge mode.

Q2 is a switch so when the timer is counting it turns on a LED indicator light telling the user the converter is in the rapid charge mode.

The interfacing of the Timer/Temperature Compensation Board and the Converter board J5 allows for additional circuitry to be added at a future time to enhance operation or to add functionality to the module. An 8-pin connector is chosen for J1 with the same intention.

A customer accessible switch is provided to allow the timer to rerun the high rate cycle if so desired. In one embodiment of the invention, once the timer cycle is started it cannot be reset until the timing cycle is completed.

Figure 3:
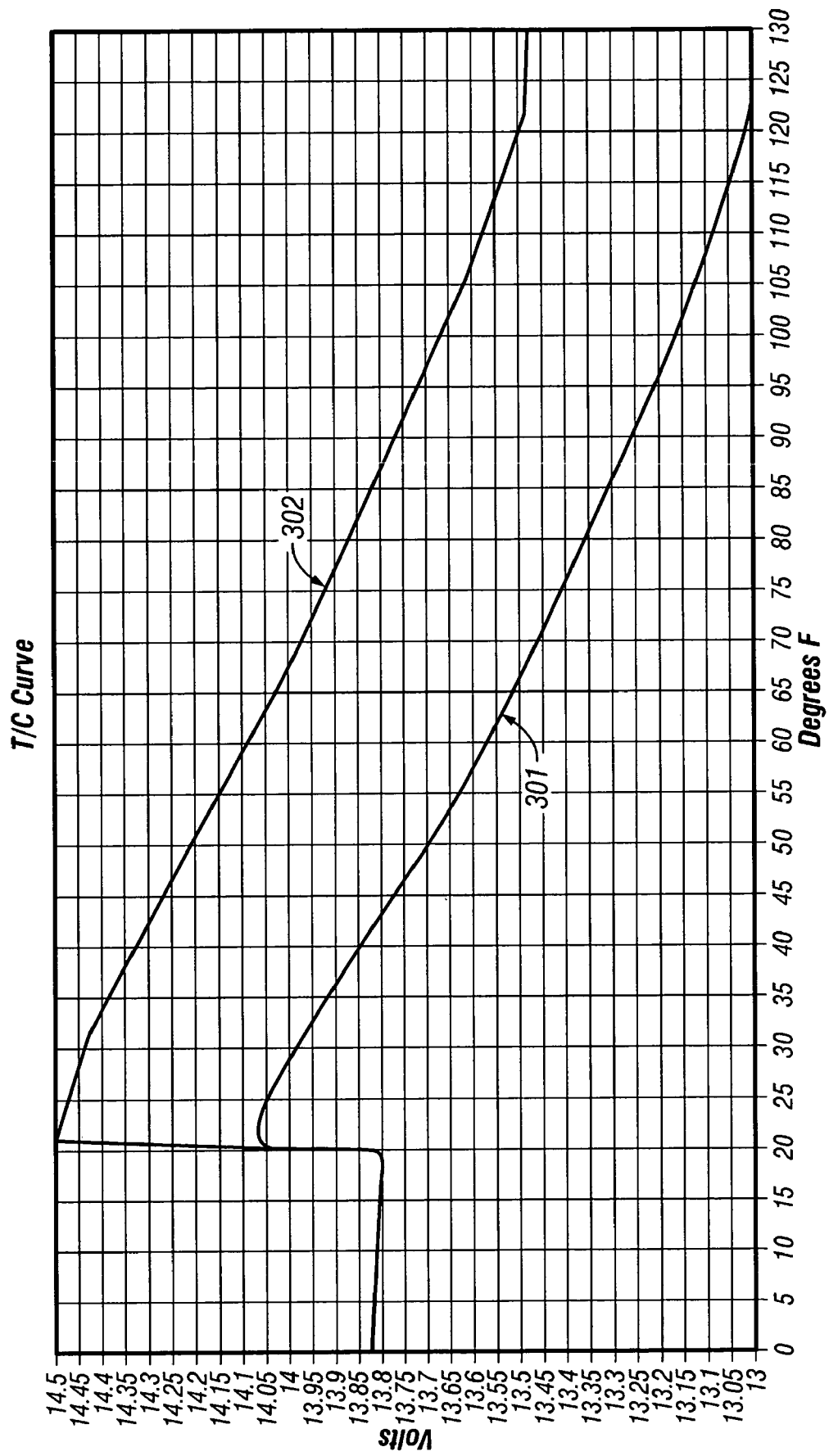
FIG. 3 is a line graph illustrating the difference in converter output versus battery temperature depending on the mode of operation in accordance with an embodiment of the present invention.

FIG. 3 is a line graph illustrating the difference in converter output versus battery temperature when operating in either the float voltage mode 301 or rapid charge mode 302.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A charging system for recreational vehicle lead-acid batteries, comprising:
   (a) a power converter connected to at least one battery;
   (b) a voltage control circuit coupled to said power converter;
   (c) a temperature sensor that connects said battery to said voltage control circuit and supplies battery temperature data to the voltage control circuit, wherein the voltage control circuit adjusts voltage output from the power converter to the battery according to a predetermined temperature curve to prevent overcharging of the battery;
   (d) a timing circuit coupled to said voltage control circuit, wherein when the power converter is turned on the timing circuit increases voltage output from the power converter by a predetermined amount above float voltage for a preset time interval and then reduces voltage output to float voltage after said preset time interval elapses; and
   (e) a manual switch that resets the timing circuit, causing another increase in voltage output above float voltage for the preset time interval.

2. The charging system according to claim 1, wherein the predetermined increase in voltage output above float voltage is adjusted according to battery temperature data.

3. The charging system according to claim 1, wherein if there is a failure in the temperature sensor power converter voltage output drops to a predetermined level to protect loads connected to the battery.

4. The charging system according to claim 3, wherein the predetermined output level is approximately 12.6 volts.

5. The charging system according to claim 1, wherein the power converter is connected to multiple batteries.

6. The charging system according to claim 1, wherein voltage output is limited to approximately 14.45 volts to prevent damage to loads connected to the battery.

7. The charging system according to claim 1, wherein the temperature sensor in part (c) is a thermistor.

8. A method for charging recreational vehicle lead-acid batteries, the method comprising the steps of:
   (a) monitoring the temperature of at least one battery coupled to a power converter, wherein the power converter has a reference voltage against which it compares the output voltage of the battery, and wherein the power converter immediately compensates for any deviation from said reference voltage; and
   (b) altering the output voltage value that the power converter detects coming from the battery according to a predetermined temperature curve, thereby adjusting voltage output from the power converter to the battery to prevent overcharging of the battery under varying temperature conditions without having to change the reference voltage of the power converter;
   (c) increasing voltage output of the power converter when the power converter is turned on by a predetermined amount above float voltage for a preset time interval and then reducing the voltage output to float voltage after said preset time interval elapses; and
   (d) using a manual switch to reset a timing circuit, causing another increase in voltage output above float voltage for the preset time interval.

9. The method according to claim 8, further comprising adjusting the predetermined increase in voltage output above float voltage according to battery temperature data.

10. The method according to claim 8, further comprising, in the event of a failure in the monitoring of battery temperature in step (a), dropping power converter voltage output to a predetermined level to protect loads connected to the battery.

11. The method according to claim 10, wherein the predetermined output level is approximately 12.6 volts.

12. The method according to claim 8, wherein the power converter is connected to multiple batteries.

13. The method according to claim 8, wherein voltage output is limited to approximately 14.45 volts to prevent damage to loads connected to the battery.

* * * * *